United States Patent [19]
Thurman et al.

[11] Patent Number: 5,989,618
[45] Date of Patent: *Nov. 23, 1999

[54] PROCESS FOR PREPARING A MICROBIOLOGICALLY STABLE WATER IN OIL SPREAD

[75] Inventors: Cynthia Thurman, Mt. Airy; Podutoori Ravinder Reddy, Columbia, both of Md.

[73] Assignee: Lipton, Englewood Cliffs, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/831,452

[22] Filed: Apr. 1, 1997

Related U.S. Application Data

[63] Continuation-in-part of application No. 08/496,856, Jun. 19, 1995, abandoned.

[51] Int. Cl.[6] ...................................................... A23D 7/00
[52] U.S. Cl. ............................................ 426/603; 426/602
[58] Field of Search ..................................... 426/602, 603

[56] References Cited

U.S. PATENT DOCUMENTS

| | | |
|---|---|---|
| 4,425,371 | 1/1984 | Stratmann ................................ 426/607 |
| 5,151,290 | 9/1992 | Norton et al. . |
| 5,169,668 | 12/1992 | Milo ........................................ 426/602 |
| 5,302,408 | 4/1994 | Cain et al. . |

OTHER PUBLICATIONS

Gunstone 1983 Lypids in Foods Chemistry, Biochemistry and Technology Pergamon Press New York pp. 147–155.

*Primary Examiner*—Carolyn Paden
*Attorney, Agent, or Firm*—Matthew Boxer

[57] ABSTRACT

A fat continuous spread having less than 50% fat and containing less than 10% trans fatty acids is prepared by a process comprising the steps of selecting a structuring amount of interesterfied hardstock and combining the hardstock with the liquid oil to form a fat phase. The fat phase and an aqueous phase containing a gelling agent are introduced into a scrapped surface heat exchanger to form a cooled emulsion having an exit temperature of less than the temperature required to form a substantial amount of alpha crystals in the fat phase. The crystal containing emulsion is then passed into a crystallizing inverter unit which has a temperature no greater than about 4 to about 8° C. of the temperature of the water continuous emulsion containing crystals. In the inverter unit, the emulsion is inverted from a water continuous to a fat continuous emulsion and then introduced into a second cooling unit to form spread products having a mean average droplet size less than 10 microns and containing less than 5% free water.

24 Claims, No Drawings

PROCESS FOR PREPARING A MICROBIOLOGICALLY STABLE WATER IN OIL SPREAD

This application is a continuation-in-part of U.S. Ser. No. 08/496,856, filed Jun. 19, 1995, now abandoned.

FIELD OF THE INVENTION

The invention relates to a fat continuous spread having less than 50% of a fat phase and less than 10% trans fatty acids prepared by a process which produces a microbiologically stable spread product.

BACKGROUND OF THE INVENTION

The present invention is concerned with a process for preparing a dispersion comprising a continuous fat phase and a dispersed gelled aqueous phase. Prior art methods of preparing such low fat continuous spread products first cooled a gelatin containing water continuous composition to a temperature below the gel setting temperature to allow the formation of a gel structure. The resulting water continuous composition was then sheared in a crystallizing inverter unit (C* unit) to invert the water continuous composition into small gelled aqueous beads and form a fat continuous dispersion. It was recognized in the art that this process aided in the control of the aqueous phase droplet size distribution in the final dispersion and that reduced droplet size and distribution are advantageous in determining appearance, flavor and salt release and rheology of the dispersion. Additionally, smaller droplet size and distribution in the final product improves microbial stability. See U.S. Pat. No. 5,151,290 issued to Norton et al. on Sep. 29, 1992.

However, it was observed that low fat containing products which are also high in trans fatty acid content produced by the known methods still exhibited microbial instability. The average droplet of such products still average greater than about 20 microns and provide a possibility for microbial contamination.

The prior art focuses on improving the production process by utilizing cooling temperatures just below the gel setting temperature of the level of gelatin contained in the aqueous phases of these products.

Whereas shelf stable products can thus be produced, the process needs to be improved to produce low trans fatty acid containing spreads. It has been surprisingly observed that certain temperatures at which low trans containing fats crystallize in the process synergistically both crystallize the fat and gelling the gelatin so as to form products with much smaller aqueous droplets than those that could be produced in the prior art.

There therefore exists a need for an improved process for making a fat continuous product having less than 40% fat which has both good organoleptic properties and which is microbiologically stable.

Another object of the invention is to provide an in line production process which is flexible enough to be modified as the trans fatty acid levels of the spread products are reduced.

SUMMARY OF THE INVENTION

The invention relates to a novel process for producing a fat continuous plastic dispersion having less than 50% fat and less than 10% trans fatty acid content. The spread product also has a mean aqueous phase droplet size distribution of less than 10 microns and less than 5% free water as described below. The process comprises mixing a aqueous phase and oil phase which contains an interesterfied hardstock in a scrapped surface heat exchanger to a temperature below the alpha phase of crystallization of the fat phase, preferably less than 10° C. to form a cooled and substantially phase crystallized emulsion. The emulsion is then introduced into a crystallizing inverter unit having a shearing rate which inverts the emulsion from an oil in water (i.e. water continuous) to a water in oil (i.e. fat continuous) emulsion. The preferred shearing rate is 500 to 1500 rpm and the temperature of the C* unit is 4 to 80° C. higher than the exit temperature of the cooled emulsion. The fat continuous emulsion leaves the C* unit and passes through a second scrapped surface heat exchanger (A-unit) to be packed as a stick product after optimally passing thorugh a resting tube (B unit) or a soft product (tub) after optimally passing through a C-unit of shear rate 150 to 700 rpm to reduce the hardness in the product. In both cases the end product has a mean aqueous phase droplet size distribution product of the dispersed aqueous phase of less than 10 microns and having less than 5% free water.

DETAILED DESCRIPTION OF THE PREFERRED EMBODIMENTS

The process in the present invention provides a means for preparing a low trans fatty acid containing continuous fat product which is microbiologically stable.

A fat continuous spread having less than 50% fat is prepared by combining an oil or fat phase and an aqueous phase. The fat phase contains from about 5 to about 40% of a hardstock which has been interesterfied as described below and 60 to 95% of a liquid vegetable oil to form a product having a trans fatty acid level of not more than 10% of the total composition. A partially or fully hardened vegetable oil may optionally be added to the fat phase.

Throughout the application, the terms "fat" and "oil" may be interchanged and refer to a variety of edible fatty triglycerides, such as soybean oil, cottonseed oil, peanut oil, olive oil, palm oil, corn oil, rapeseed oil, sunflower seed oil, sesame oil, safflower oil and mixtures thereof. If animal oils are desirable, sardine oil, lard and tallow may be used. Preferred vegetable oils include soybean oil, rapeseed oil, particularly low erucic acid, and mixtures thereof. To increase the levels of trans fatty acids in triglycerides, the vegetable oil may be partially or fully hardened.

Edible substances that are physically similar to triglyceride such as waxes, (e.g. jojoba oil) and poly fatty acid esters of mono- or disaccharides can be used as replacement or in a mixture with triglycerides may also be used.

The fat blend or hardstock useful in the invention should contain less than 10% trans fatty acids, preferably 0.1 to 8%, most preferably 0.1 to 4%. The hardstock is preferably prepared by randomly interesterfying a mixture containing 30 to 75 wt. % of an oil (i) in which at least 20% of the fatty acid residues consist of linoleic acid and 25 to 70 wt. % of a fat (ii) in which at least 80% of the fatty acid residues is saturated and have a chain link of at least 16 carbon atoms. The interesterfied mixture is then fractionated to contain an olein having the following solid fat content:

$N_{10}$=22 to 80
$N_{20}$=8 to 60
$N_{30}$=1 to 25
$N_{35}$=0 to 15

The higher melting stearin has been separated and 50 to 90% of the olein is mixed with 10 to 50 wt. % of an oil (iii) in which at least 40% of the fatty acid residues consist of linoleic acid.

The solid fat contents are expressed in N-values, essentially as described in Fette, Sefein, Anstrichmittel Vol. 80, pp. 180–186 (1978). Although the method was modified during the stabilization of the material before measurement, in all cases the fat was stabilized for 16 hours at 0° C. and one hour at the measuring temperature.

Oil (i) preferably is a vegetable oil, such as soybean oil, sunflower oil, safflower oil, rapeseed oil, particularly low erucic acid, cottonseed oil, maze oil, olive oil and mixtures thereof.

The oil or fat (ii) preferably is any of the oils (i) or a mixture thereof, which has been hydrogenated to obtain a fat in which at least 80% of the fatty acid residues is saturated using, for example, a freshly precipitated nickel catalyst under conditions avoiding trans fatty acids formation to a level of less than 10%. Oil or fat (ii) preferably has a melting point range of 50 to 70° C. and an iodine value of less than 10, preferably less than 5, most preferably about 1.

The oil (iii) preferably is a safflower oil, a sunflower oil, a maze oil, a grapeseed oil, a soybean oil, rapeseed oil, cottonseed oil or mixtures thereof.

Most preferably (i), (ii) and (iii) are from the same source for convenience and for availability for a reasonable price.

Random interesterfication can be carried out in any means known in the art such as described in U.S. Pat. No. 4,425,371 issued to Stratman et al. on Jan. 10, 1984, herein incorporated by reference.

Fractionation can be carried out either in the presence or absence in a solvent, preferably using dry fractionation. An olein fraction obtained from the fractionation process is defined above a stearin obtained has the following characteristics:

$N_{10}=45-70$ $N_{15}=44-65$ $N_{20}=42-52$ $N_{25}=30-40$ $N_{30}=27-37$ $N_{35}=20-30$

The product comprises from about 50 to about 95% of aqueous phase, mostly water. The aqueous phase further contains gelatin which may be combined with other gelling agents such as native starch, hydrolyze starch and starch derivatives. In particular, starch is selected from the group consisting of waxy starch, hydrolyzed starch, cross-linked starch can then officially be included in the aqueous phase. An example of a cross-linked starch which can be suitably used is maltodextrin.

When gelling starches are included in the water continuous composition, the total concentration of these gelling starches should remain below three times, preferably below one time the critical concentration of the gelling starch or concentration of gelling starches used. The inclusion of even a low concentration of such starches has been found to substantially increase the gelation rate of gelatin and speed up the process according to the invention.

The mean aqueous phase droplet size distribution of the dispersed aqueous phase in the final product is less than about 10 microns, preferably less than about 5 microns and the amount of free water present is less than about 5%, preferably less than 3%, most preferably 0%. Free water is defined as the water in the droplet of greater than 200 microns. The droplet size and distribution is determined by a method described in J. C. van den Enden, D. et al., J. Colloid, Interface Science 140(i) (1990) pp 105–113 and also described in U.S. Pat. No. 5,302,408, herein incorporated by reference.

Fat continuous products containing greater than 10% trans fatty acids are consistently observed to have a droplet size and distribution of greater than 20 microns and greater than 15% free water, often greater than 25% free water. This relatively large size and distribution of the water provides an opportunity for microbial contamination and reduced shelf life. The inventive process overcomes these problems by synergistically cooling the fat and aqueous phase to subsequently produce a more stable product.

The crystallization process of fat involves a cooling step in which the liquid oil becomes supersaturated with respect to certain acylglycerol components, followed by solidification. During crystallization, suitable fats can exist in more than one crystalline modification or exhibit polymorphism. The three phases observed for triglycerides are basically alpha, beta prime and beta. In the inventive process, the temperature of cooling in the initial scrapped surface heat exchanger unit (A-unit) must be below the temperature required to form a substantial amount of the triacyl glycerols in alpha phase, i.e. greater than 50% in alpha phase, preferably greater than 60%. In the alpha phase, the chains are oriented perpendicular to the end group plane. The phases of the crystallized fat may be determined by x-ray powder defraction which determines the orientation of the fat chains by any conventional method known in the art.

The spread compositions may also comprise dairy and non-dairy ingredients of the source of fat, flavoring and protein. The amount of the ingredient present in the compositions is selected depending on the effect of the protein ingredient on mouth feel and sourness. The dairy fat can be derived from any dairy source such as whole milk, semi-skimmed milk, skimmed milk, cultured buttermilk, buttermilk powder, skimmed milk powder, yogurt, quark, fromage frais, cottage cheese, whey powder, butter, etc.

To affect the flavor of the sticks of the invention dairy fat may optionally be incorporated in the product by using at least 3% of a dairy ingredient in the spread. The optimum level of dairy ingredients will be dependent on the type and fat level of the spread product. The amount and kind of emulsifier are not critical. It is preferred to incorporated emulsifiers of the type and quantity as are commonly used in spread and margarine products. For example, mixtures of mono- and diglycerides derived from natural, partially hydrogenated or fully hardened sunflower oil may be used, in an amount of 0.1 to about 0.5 wt. %, calculated on the total weight of the product.

Additionally, fat soluble flavors and colors may be added to the oil phase. These flavors and colors may be of natural origin or artifically synthesized.

Minor amounts of optional ingredients can be included in the water phase of the formulation to achieve a desirable flavor and to retard microbiological deterioration of the product or in storage. Typical optional ingredients which are incorporated in the water phase are:

| | |
|---|---|
| salt, NaCl | 0.5 to 3.0 wt. % |
| potassium sorbate | 0.05 to 0.2 wt. % |
| EDTA | 50 to 100 ppm |

Acidifiers may be incorporated to bring the pH of the product to the desired level, preferably the pH is from 3 to 7, more preferred 3.5 to 5.5. Suitable acidifiers are lactic acid and citric acid.

The final product may be packed in any conventional form such as stick, tub, etc. The solids content of the product should be varied as desirable for the selected form. For instance, the solid fat content for a tub product should be:

$N_{10}$=12–30
$N_{20}$=4–20
$N_{30}$=0.5–10
$N_{35}$=0–5

The solid fat content for a stick product should be:
$N_{10}$=16–45
$N_{20}$=4–30
$N_{30}$=1–15
$N_{35}$=0–5

For the process according to the invention, it is essential that the first three units in the production line of the product be a crystallizing inverter unit (i.e. C* unit) positioned between two scrapped surface heat exchanger units (A-units) having particular temperature ranges relative to the crystallizing inverter unit. Moreover, the shear rate or shaft rotation speed in the C* unit must be such that the emulsion is inverted from a water continuous to a fat continuous product with a significant rise in temperature.

Specifically, the aqueous and fat phases are added to a first heat exchanger unit (A-unit) in a batch wise manner or a continuous manner by separately metering each component into the A-unit. The A-unit not only mixes the fat and aqueous phases together but also cools the emulsion and starts the crystallization process by removing the heat of crystallization. The temperature range in the A-unit must be low enough to form a substantial amount (greater than 20%) of alpha phase fat crystals in the fat phase. In particular, the temperature in the A-unit should be less than about 12° C., preferably 4 to 10° C., most preferably 6 to 10° C. The temperature of the A-unit is measured as an exit temperature of the emulsion as it leaves the A-unit and passes into the crystallization inverter unit (C* unit).

The cooled emulsion which also contains the gelled agent passes from the A-unit into the C* unit. In the C* unit the cooled water continuous emulsion is inverted into a fat continuous emulsion by quickly increasing the shaft rotation speed or shear rate which is in the range of 100–300 to the range of 500–1500 rpm.

The length of the C prime unit is termed L/D and should be 1 to 4.

The temperature of the emulsion exiting the C-unit must not be more than 2 to 10° C. higher than the exit temperature of the cooled emulsion passing from the A-unit, most preferably 3 to 6° C.

The temperature in the second A-unit should be 4 to 20, preferably 6 to 15.

The crystallized fat continuous emulsion passes from the C* unit into a second surface heat exchanger unit (A-unit) to be cooled again to form a product having less than 40% fat and having a mean droplet size of the dispersed aqueous phase of less than 10 microns, preferably 1 to 5 microns. Additionally, the product should contain less than 5% free water, more preferably less than 3% free water.

Optionally, the fat continuous emulsion may pass from the second heat exchanger from one or more crystallizing units (C-units), one or more A-units and a resting tube (B-unit) at the end of the production line if additional residence time is desirable.

The residence time of the emulsion in the production process line should be about 0.5 to about 4 min., preferably 1 to 3 min. The desirable residence time depends on the amount of trans fatty acid in the product so that the greater the amount of trans fatty acids the lower the residence time. For example, emulsions containing greater than about 4% trans fatty acids may require residence time of less than 40 seconds so that only the A-unit-C* unit-A-unit configuration may be needed in the production line.

The following example illustrates without limitation the subject invention.

EXAMPLE 1

Samples of two types of products were prepared as follows:

Sample 1 is a product according to the invention having an oil blend with the inventive hardstock with a trans fatty acid percent of 2% according to the invention. The formula for Sample 1 was as follows:

|  | Weight % |
| --- | --- |
| Oil Phase | |
| Partially hydrogenated bean oil | 3.2 |
| Soybean oil | 23.1 |
| Interesterfied hardstock of rapeseed and soybean oil (dry fractionated interesterfied mixture of fully hardened soybeal oil and liquid oil) | 13.45 |
| Lecithin | 0.2 |
| Saturated distilled monoglycerides | 0.15 |
| Total Fat Phase | 40 |
| Aqueous Phase | |
| Water | 56.77 |
| Gelatin | 2.5 |
| Flavors, preservatives and acidifiers | 0.73 |
| Total Aqueous Phase | 60 |

In contrast, Sample 2 is a product having a prior art oil blend with a trans fatty acid percent of 15%. The formula for Sample 2 is as follows:

|  | Weight % |
| --- | --- |
| Oil Phase | |
| Partially hydrogenated bean oil | 15.86 |
| Soybean oil | 23.79 |
| Interesterfied hardstock of rapeseed and soybean oil (dry fractionated interesterfied mixture of fully hardened soybeal oil and liquid oil) | 0 |
| Lecithin | 0.2 |
| Saturated distilled monoglycerides | 0.15 |
| Total Fat Phase | 40.00 |
| Aqueous Phase | |
| Water | 50.77 |
| Gelatin | 2.5 |
| Flavors, preservatives and acidifiers | 0.73 |
| Total Aqueous Phase | 60 |

Sample 1 (with hardstock according to the invention) was prepared according to the inventive process as follows: Sample 1 was passed through a production line having a sequence of:

A1-unit, C*1-unit, A2-unit, B-unit

Sample 1 was processed under the following conditions according to the invention:

| A1 temperature | 8° C. |
| --- | --- |
| A1 rpm | 250 |

-continued

| | |
|---|---|
| C* temperature | 12° C. |
| C* rpm | 900 |
| A2 temperature | 13° C. |
| A2 rpm | 250 |
| B unit | |

In contrast, Sample 2 (prior art hardstock) was processed under processing conditions described in the art as follows:

| | |
|---|---|
| A1 temperature | 12–14° C. |
| A1 rpm | 250 |
| C* temperature | 16–17° C. |
| C* rpm | 1000 |
| A2 temperature | 16° C. |
| A2 rpm | 250 |

The mean droplet size of the dispersed aqueous phase of the samples and the free water content of the samples were measured as described in J. Colloid, Interface Science 140(i) (1990) pp 105–113. The results are reported in the table below.

| Sample | Mean Droplet Size D3,3 | Free Water % |
|---|---|---|
| Invention - Sample 1 | 6.3 | 0.12 |
| Prior Art - Sample 2 | 20.1 | 18.9 |

It was observed that the samples having a low trans fatty acid content within the inventive scope and prepared by the inventive process (Sample 1) had a mean droplet size of one-third of the droplet size observed in the products having a prior art oil blend produced by the prior art process. Additionally, substantially no free water was observed in the inventive products produced by the inventive process (Sample 1) whereas almost 20% free water was observed in products with prior art oil blend and produced by the prior art process.

We claim:

1. A fat continuous spread having up to 50% of a fat containing less than 10% trans fatty acids prepared by a process comprising the steps of:
   (1) selecting a structuring amount of a hardstock fat to make a spread, the hardstock fat having a level of trans fatty acids not exceeding 10% and prepared by randomly interesterfying a mixture containing 30–75 wt. % of an oil i) in which at least 20% of the fatty acids residues consist of linoleic acid and 25–70 wt. % of a fat (ii) in which at least 80% of the fatty acid residues is saturated and has a chain link of at least 16 carbons and then fractionating the interesterfied mixture to obtain an olein fraction having a solid fat content of:
   $N_{10}=22-80$,
   $N_{20}=8-60$,
   $N_{30}=1-25$,
   $N_{35}=0-15$;
   (2) selecting an effective amount of a liquid oil at room temperature from the group consisting of soybean oil, sunflower oil, fish oil, rapeseed oil, coconut oil and mixtures thereof;
   (3) combining the hardstock fat of step (1) and the liquid oil of step (2) to form a fat phase;
   (4) preparing an aqueous phase comprising an effective amount of a gelling agent to combine with the fat phase of step (3) to provide a water continuous emulsion having less than 50% fat in the total composition;
   (5) introducing the water continuous emulsion into a scrapped surface heat exchanger unit to cool the water continuous emulsion to an exit temperature of less than the temperature needed to transform a substantial amount of the fat crystals into an alpha phase;
   (6) passing the alpha phase containing emulsion into a crystallizing inverter unit with an exit temperature from 4 to about 8° C. higher than the temperature of the alpha phase containing emulsion and having a shearing rate which inverts the water continuous emulsion into a fat continuous emulsion;
   (7) passing the fat continuous emulsion into a second scrapped surface heat exchanger unit to cool the fat continuous emulsion and provide a fat continuous spread having a mean aqueous droplet diameter of less than 10 microns and containing less than 5% free water.

2. A fat continuous spread according to claim 1 wherein the exit temperature of the cooled emulsion of step 5 has an exit temperature of from about 4 to about 12° C.

3. The fat continuous spread according to claim 1 wherein the shearing rate of the crystallizing inverter unit of step 6 is about 500 to about 1500 rpm.

4. The fat continuous spread according to claim 1 wherein oil (i) is a vegetable oil selected from the group consisting of soybean oil, sunflower oil, fish oil, rapeseed oil, coconut oil, peanut oil, palm oil, corn oil, sesame oil, sardine oil, lard, tallow and mixtures thereof.

5. The fat continuous spread according to claim 1 wherein fat (ii) is a hydrogenated oil having a melting point ranging from 50 to 70° C. and has an iodine value of less than 10.

6. The fat continuous spread according to claim 1 wherein partially or fully hardened vegetable oil is added to the liquid oil and hardstock fat in step (3) to form the fat phase.

7. The fat continuous spread according to claim 1 wherein the trans fatty acid level of the spread is 0.1 to 8%.

8. The fat continuous spread according to claim 7, wherein the trans fatty acid level of the spread is 0.1 to 4%.

9. The fat continuous spread according to claim 1 wherein the mean aqueous droplet diameter is less than 5 microns and the free water content is less than 3%.

10. The fat continuous spread according to claim 1 wherein the alpha phase of the cooled emulsion is greater than 20%.

11. The fat continuous spread according to claim 1 wherein the fat continuous emulsion is passed through an additional scrapped surface heat exchanger unit and a crystallizing unit.

12. The fat continuous spread according to claim 1, wherein the free water content is about 0%.

13. The fat continuous spread according to claim 1, wherein fat least 50% of triacyl glycerols are in the alpha phase.

14. The fat spread according to claim 1, wherein at least 60% of the triacyl glycerols is in the alpha phase.

15. A process for preparing a fat continuous spread having less than 50% fat comprising the steps of:
   (1) selecting a structuring amount of a hardstock fat to make a stick product, the hardstock fat having a level of trans fatty acids not exceeding 10% and prepared by randomly interesterfying a mixture containing 30–75 wt. % of an oil (i) in which at least 20% of the fatty acids residues consist of linoleic acid and 25–70 wt. % of a fat (ii) in which at least 80% of the fatty acid residues is saturated and has a chain link of at least 16 carbons and then fractionating the interesterfied mixture to obtain an olein fraction having a solid fat content of:

$N_{10}$=22–80,
$N_{20}$=8–60,
$N_{30}$=1–25,
$N_{35}$=0–15;

(2) selecting an amount of an oil which is liquid at room temperature selected from the group consisting of soybean oil, sunflower oil, fish oil, rapeseed oil, coconut oil and mixtures thereof;

(3) combining the hardstock fat of step (1) and the liquid oil of step (2) to form a fat phase;

(4) preparing an aqueous phase comprising an effective amount of a gelling agent to combine with the fat phase of step (3) to provide a water continuous emulsion having less than 50% fat in the total composition;

(5) introducing the water continuous emulsion into a scrapped surface heat exchanger unit to cool the water continuous emulsion to an exit temperature of less than the temperature needed to transform a substantial amount of the fat crystals into an alpha phase;

(6) passing the alpha phase containing emulsion into a crystallizing inverter unit with an exit temperature from 4 to about 8° C. higher than the temperature of the alpha phase containing emulsion and having a shearing rate which inverts the water continuous emulsion into a fat continuous emulsion;

(7) passing the fat continuous emulsion into a second scrapped surface heat exchanger unit to cool the fat continuous emulsion and provide a fat continuous spread having a mean aqueous droplet diameter of less than 10 microns and containing less than 5% free water.

16. The process according to claim 15 wherein the exit temperature of the cooled emulsion of step 5 has an exit temperature of from about 4 to about 10° C.

17. The process according to claim 15 wherein the shearing rate of the crystallizing inverter unit of step 6 is about 500 to about 1500 rpm.

18. The process according to claim 15 wherein oil (i) is an oil selected from the group consisting of soybean oil, sunflower oil, fish oil, rapeseed oil, coconut oil, peanut oil, palm oil, corn oil, sesame oil, sardine oil, lard, tallow and mixtures thereof.

19. The process according to claim 15 wherein fat (ii) is a hydrogenated oil having a melting point ranging from 50 to 70° C. and has an iodine value of less than 10.

20. The process according to claim 15 wherein partially or fully hardened vegetable oil is added to the liquid oil and hardstock fat in step (3) to form the fat phase.

21. The process according to claim 15 wherein the trans fatty acid level of the spread is 0.1 to 8%.

22. The process according to claim 15 wherein the mean aqueous droplet diameter is less than 5 microns and the free water content is less than 3%.

23. The process according to claim 15 wherein the alpha phase of the cooled emulsion is about 20%.

24. The process according to claim 15 wherein the fat continuous emulsion is passed through an additional scrapped surface heat exchanger unit and a crystallizing unit.

* * * * *